D. B. SHERMAN.
REVOLVING GARDEN AND FIELD HOE.

No. 181,870. Patented Sept. 5, 1876.

WITNESSES:
Francis McArdle,
John Goethals

INVENTOR:
D. B. Sherman
BY
ATTORNEYS.

UNITED STATES PATENT OFFICE.

DAVID B. SHERMAN, OF CASTLETON, VERMONT.

IMPROVEMENT IN REVOLVING GARDEN AND FIELD HOES.

Specification forming part of Letters Patent No. 181,870, dated September 5, 1876; application filed July 15, 1876.

*To all whom it may concern:*

Figure 1:
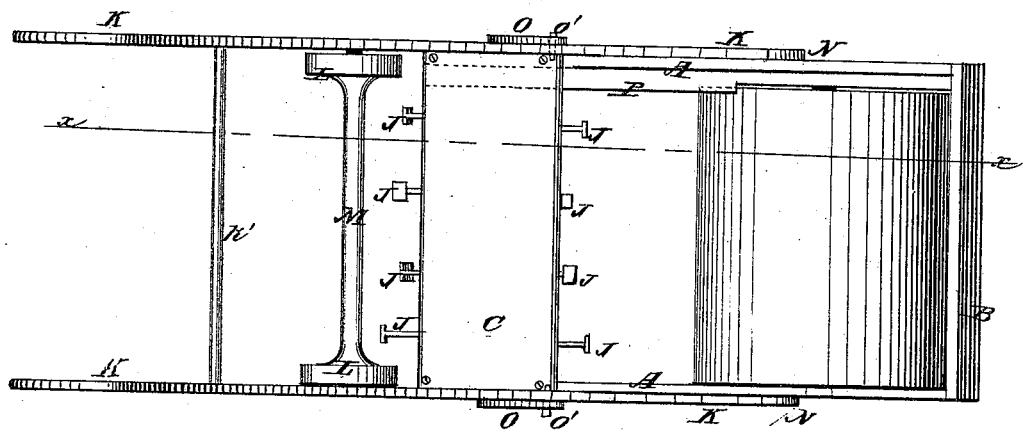
Figure 2:
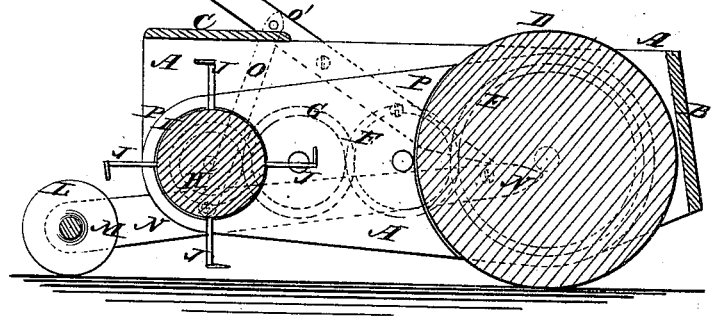

Be it known that I, DAVID BARNUM SHERMAN, of Castleton, in the county of Rutland and State of Vermont, have invented a new and useful Improvement in Revolving Garden and Field Hoe, of which the following is a specification:

Figure 1 is a top view of my improved machine. Fig. 2 is a vertical longitudinal section of the same, taken through the line $x\,x$, Fig. 1.

Similar letters of reference indicate corresponding parts.

The object of this invention is to furnish an improved hand-machine for destroying the weeds and loosening up the soil in gardens among vegetables planted in rows or drills, and which shall be simple in construction, convenient in use, and effective in operation.

The invention consists in the combination of the roller, the gear-wheels, the roller and hoes, the wheels and shaft, the pivoted arms, and the adjusting-bars with each other and with the frame and the handles, as hereinafter fully described.

A are two side boards, connected by a board, B, attached to their forward ends, and by a board, C, attached to the upper edges of their rear ends. To and between the forward ends of the side boards A is pivoted a roller, D, to one of the journals of which is attached a gear-wheel, E. The teeth of the gear-wheel E mesh into the teeth of a gear-wheel, F, pivoted to the side board A, and the teeth of which mesh into the teeth of a gear-wheel, G, also pivoted to the side board A. The teeth of the gear-wheel G mesh into the teeth of a gear-wheel, H, attached to the journal of the roller I, pivoted to and between the rear ends of the side boards A. To the face of the roller I are attached the shanks of a number of small holes, J, the blades of which are an inch and a half, more or less, square. The machine is propelled by the handles K, the forward ends of which are rigidly attached to the middle part of the side boards A, and the rear parts of which are connected by a round, $k'$. The rear part of the machine is supported by two wheels, L, the shaft M of which is pivoted to the rear ends of two arms, N. The forward ends of the arms N are pivoted to the side boards A, below the forward ends of the handles K, and to their rear parts are pivoted the lower ends of two bars, O, the upper ends of which are attached to the handles K by detachable pins or bolts $o'$. Several holes are formed in the handles K to receive the pins or bolts $o'$, to enable the wheels L to be adjusted to support the hoes J above the ground, or to work at any desired depth in the ground. The gear-wheels E F G H are covered with a casing, P, to protect them from the soil and weeds.

I am aware that it is not new to make a horse-hoe with rotary hoes arranged between a rear roller and front wheels; but

What I claim is—

A frame consisting of side boards A, front end board B, rear top board C, and handles K, in combination with roller, rotary hoe, and wheel-axle, substantially as and for the purpose specified.

DAVID BARNUM SHERMAN.

Witnesses:
 MARTIN D. COLE,
 BENJ. F. ADAMS,
 M. B. DEWEY,
 L. W. PRESTON.